Dec. 16, 1958  M. E. ADAMS  2,864,297
CULTIVATING AND WEEDING IMPLEMENTS
Filed Aug. 9, 1954  2 Sheets-Sheet 1

INVENTOR.
MONTE E. ADAMS
BY *Everett M. Curtis*
ATTORNEY

Dec. 16, 1958     M. E. ADAMS     2,864,297
CULTIVATING AND WEEDING IMPLEMENTS
Filed Aug. 9, 1954     2 Sheets-Sheet 2
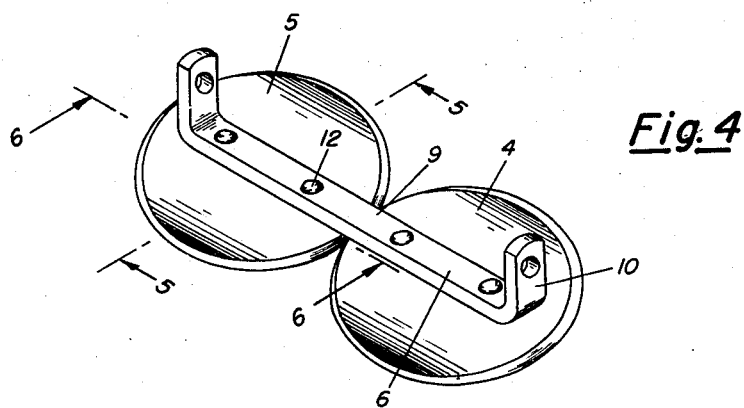
Fig. 4
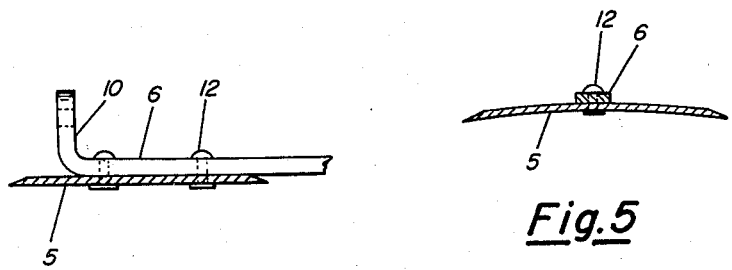
Fig. 5
Fig. 6
INVENTOR.
MONTE E. ADAMS
ATTORNEY – # United States Patent Office 2,864,297
Patented Dec. 16, 1958

2,864,297

CULTIVATING AND WEEDING IMPLEMENTS

Monte E. Adams, San Diego, Calif.

Application August 9, 1954, Serial No. 448,517

2 Claims. (Cl. 172—376)

My invention relates to gardening or cultivating implements, and its objects are to loosen the soil and to cut it clear of weeds, to pile the weeds that have been cut, and to smooth the surface of the ground as in raking, and to effect a more effectual tilling of the soil. By providing such implement with circular or oval disc-like cutting blades circumferentially sharpened and operating to cut vegetation upon contact, the said blades will not only cut weeds when forwardly moved to effect contact therewith, but also when moved rearwardly, and will at the sides cut said weeds in passing, whether moved forward or back. The implement is especially useful in its back cutting operations, since through such action, weed cutting in trenches is simplified, and at the same time the implement is stabilized and made more effective. The side cutting action is also very efficient in allowing close approach and cutting contact with weeds adjacent to curbs, walls, and other structures. As a gardening tool, the implement is especially useful in the removal and for the treatment of weeds to be found in flower beds, flower and vegetable gardens, patios, tree wall enclosures, trenches, and even in large yard areas. My invention further consists of other novel features of construction, and combinations and arrangements of elements and parts illustrated in the drawing and as hereinafter more specifically pointed out and claimed.

Attention is hereby directed to the accompanying drawing illustrating a construction embodying a preferred form of my invention in which similar numerals of designation refer to similar parts throughout the several views, and in which, Figure 1 is an isometric view of said construction, showing the same in operative position;

Fig. 4 is an isometric view of another form of said blades and mounting bar illustrated in Fig. 1, and showing said blades front to rear convex in form as seen from above, and concave as viewed from below;

Fig. 5 is a sectional view of one of the blades and mounting bar shown in Fig. 4, on line 5—5 thereof, looking in the direction indicated by the arrows, and Fig. 6 is a sectional view of said blade and mounting bar of Fig. 4, on line 6—6 thereof, looking in the direction indicated by the arrows.

Figure 1:
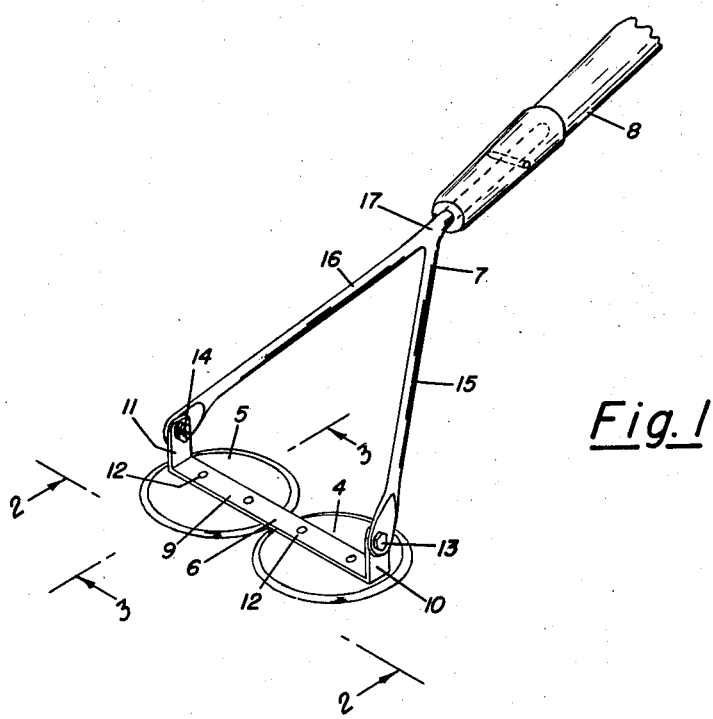

Referring to the drawing, my improved weeding implement generally comprises the blades 4 and 5, the U-shaped mounting bar 6, the Y-shaped fork 7, and the handle 8.

The plate-like blades 4 and 5 are each in the form of circular or oval discs with a cutting edge continuously extending around the periphery thereof. Preferably, said blades are bevelled circumferentially to provide a keener sharpened cutting edge. They are preferably of tough and durable steel, carefully tempered to sustain a great deal of use, but they may be of any suitable material. They may be circular or oval or elliptical in shape, and may be flat, concave or convex, and of any thickness or number convenient for the purpose. For general use, the circular disc type shown in the drawing is most effective, it being more easily manipulated in close spaces and particularly where back cutting is desired.

In Figs. 4, 5 and 6, I have shown the form of curved disc-like cutting blade adopted and used by me in commercial production and distribution, the said blade being bent convex from front to rear as looked at from above and concave as looked at from below; such form being obviously of greater utility where depth of contact with the weeds is required to effect better loosening of the soil and more effective evacuation of the weeds therein.

Figure 2:
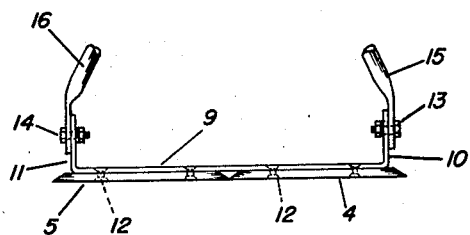
Fig. 2 is an end elevationary view of the disc-like cutting blades with circumferentially sharpened edges, and adjacent parts looking in the direction indicated by the arrows 2—2.
Figure 3:
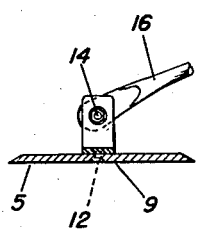
Fig. 3 is a sectional view of one of the blades on line 3—3 of Fig. 1 looking in the direction indicated by the arrows.

The U-shaped mounting bar 6 is preferably of metal, and preferably rectangular in cross-section. Its central portion 9 is flat on the bottom, and its end portions 10 and 11 are bent upwardly at right angles to said central portion. To the bottom of said portion 9 by means of rivets or screws 12 extending through openings provided therefor are firmly secured the blades 4 and 5, in tangential position in sequence one to the other and protruding beyond said end portions as shown in Figs. 1 and 2. If desired, the tangential contact portions of said blades may be flattened better to secure the desired shearing action of the cutting edges thereof. By the words "disc-like cutting blades" as used in the claims, I desire to be understood as including blades which in the general dictionary sense are even plates of material that are each circular or approximately circular, and have the contour of their peripheries round, circular, oval or elliptical in form in contradistinction from concave cavities or other recesses formed therein, and also blades sequentially disposed which are formed in one integral plate or strip.

Pivotally connected by means of the bolts 13 and 14 to upright end portions 10 and 11, of the bar 6, are the tines 15 and 16 respectively of the Y-shaped fork 7, the shank 17 of said fork being firmly affixed to the handle 8. As is obvious, this method of attachment of the fork to the said bar furnishes a ready means for adjusting the cutting angle of the said blades to said handle. The handle 6 is preferably of wood, but may be of metal or other suitable material.

In the operation of this implement, the cutting blades are adjusted downward on the forward edge approximately 10 to 12 degrees from the ground parallel when the handle is held at a comfortable working position for the user. Then, by manipulating the device in back and forth strokes, while directing each stroke to a slightly different angle from the preceding stroke, the earth through which the cutters pass will be pulverized and the weeds will be cut free under the surface of the soil. Each stroke slices a layer of the earth—the more strokes the more pulverizing the effect and the deeper the cultivation. Weeds are either cut on contact with the blades or will be forced to slide on the cutting edge and are sliced free. Also, the tougher more stubborn weeds may be cut by directing the implement to bring them between two cutters and shear them off. Rocks in the soil are quickly deflected by the curvature, or angle, of the cutters. Cultivating and weeding may be accomplished where the foilage of the plant is close to the soil. At the same time, cultivation may be controlled up to the plant without touching it and the soil will hill up around the plant. Weeds cut free may be quickly and easily piled simply by raking them with the cutters. For this purpose, the implement is held in the position best suited to the size and amount of weeds.

By the word "tangentially" as used in the claims, I desire to be understood as including not only blades in actual tangential contact relation, but also blades, the tangential contact portions of which are flattened or merged to secure better shearing action of the edges thereof where said edges are disposed in continuous cutting extended relation.

My invention may be embodied in other specific forms without departing from the spirit or essential characteristics thereof. The present embodiment as above set forth is therefore to be considered in all respects as illustrative and not restrictive, the scope of my invention being indicated by the appended claims and in the light of the foregoing description, and all changes which may come within the meaning and range of equivalency of the claims are therefore intended to be embraced therein.

What I claim and desire to secure by Letters Patent is:

1. A cultivating and weeding implement, comprising a plurality of disc-like cutting blades, sequentially and tangentially disposed, the edges of which are bevelled and continuously sharpened; a U-shaped mounting bar secured to said blades with the outer edges thereof extending beyond said bar; a Y-shaped fork pivotally secured to said bar; and a handle affixed to said fork.

2. A cultivating and weeding implement, comprising a plurality of disc-like cutting blades, sequentially and tangentially disposed, the edges of which are bevelled and continuously sharpened; a U-shaped mounting bar with upstanding ends secured to said blades with the outer edges thereof extending beyond said bar; a Y-shaped fork pivotally secured to the upstanding ends of said bar; and a handle affixed to said fork.

References Cited in the file of this patent

UNITED STATES PATENTS

| | | |
|---|---|---|
| 678,535 | Bigg | July 16, 1901 |
| 841,488 | Doidge | Jan. 15, 1907 |
| 1,239,316 | Svendsen | Sept. 4, 1917 |
| 1,454,326 | Madson | May 8, 1923 |

FOREIGN PATENTS

| | | |
|---|---|---|
| 2,128 | Great Britain | Aug. 17, 1901 |